United States Patent
Boulden et al.

(10) Patent No.: US 8,963,350 B1
(45) Date of Patent: Feb. 24, 2015

(54) METHOD AND APPARATUS FOR EXTENDED OPERATION OF STEAM TURBINES IN ISLANDING MODE

(71) Applicant: Bechtel Power Corporation, Frederick, MD (US)

(72) Inventors: Mark S. Boulden, Middletown, MD (US); Seyfettin C. Gülen, Middletown, MD (US)

(73) Assignee: Bechtel Power Corporation, Frederick, MD (US)

( * ) Notice: Subject to any disclaimer, the term of this patent is extended or adjusted under 35 U.S.C. 154(b) by 0 days.

(21) Appl. No.: 14/072,995

(22) Filed: Nov. 6, 2013

(51) Int. Cl.
- F01D 15/10 (2006.01)
- F01D 13/02 (2006.01)
- F01D 17/10 (2006.01)

(52) U.S. Cl.
CPC ............... F01D 15/10 (2013.01); F01D 13/02 (2013.01); F01D 17/10 (2013.01)
USPC ........................................... 290/4 R

(58) Field of Classification Search
USPC ........................................... 290/4 R
See application file for complete search history.

(56) References Cited

U.S. PATENT DOCUMENTS

| | | | |
|---|---|---|---|
| 2,539,255 A * | 1/1951 | Karrer et al. | 60/655 |
| 4,069,674 A * | 1/1978 | Warren | 60/641.8 |
| 6,141,952 A | 11/2000 | Bachmann et al. | |
| 6,727,603 B1 | 4/2004 | McConnell et al. | |
| 8,525,362 B2 * | 9/2013 | Herzog et al. | 290/52 |
| 2010/0038917 A1 * | 2/2010 | DiAntonio et al. | 290/4 C |
| 2010/0310356 A1 * | 12/2010 | Swintek | 415/18 |
| 2012/0223532 A1 * | 9/2012 | Herzog et al. | 290/40 B |
| 2013/0044851 A1 * | 2/2013 | Winters et al. | 376/299 |
| 2014/0133966 A1 * | 5/2014 | Parry et al. | 415/123 |

FOREIGN PATENT DOCUMENTS

JP         63195303 A * 8/1988 ............... F01K 7/22

* cited by examiner

*Primary Examiner* — Joseph Waks
(74) *Attorney, Agent, or Firm* — Duane Morris LLP

(57) ABSTRACT

A steam turbine driven electric power plant with an electric generator is switchable into an islanding mode wherein a main steam turbine is shut down and a lower capacity industrial steam turbine runs the electric generator instead, to supply house power to the plant while decoupled from the power grid. This avoids operating the main steam turbine and/or its steam source at reduced ratings for which they are not optimized and keeps the plant ready for restarting. The main steam turbine, the electric machine and the industrial steam turbine are mechanically engaged or disengaged through an SSS clutch, torque converter and transmission. In another mode, the electric generator is decoupled mechanically and operated as a mechanically unloaded synchronous motor coupled to the power grid, namely as a synchronous condenser wherein phased over- or under-excitation of the motor field windings supplies reactive power to the grid.

16 Claims, 1 Drawing Sheet

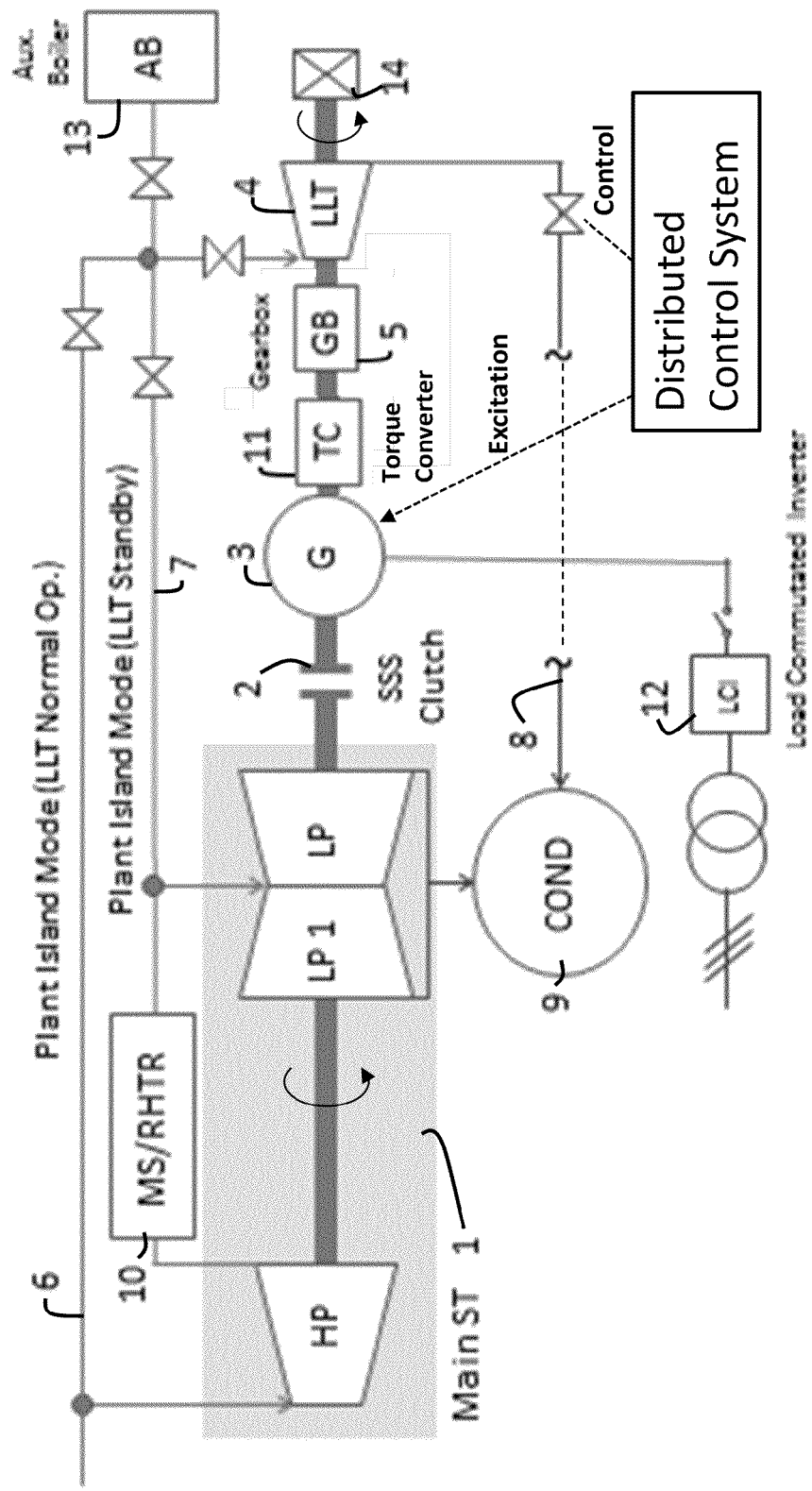

METHOD AND APPARATUS FOR EXTENDED OPERATION OF STEAM TURBINES IN ISLANDING MODE

FIELD OF THE INVENTION

This invention concerns methods and configurations that facilitate running a steam turbine electric power generation plant in "islanding" mode, potentially for an extended period of time (several days). The invention is applicable, for example, to fossil fuel fired and nuclear powered plants.

BACKGROUND OF THE INVENTION

When in "island" or "islanding" mode, a steam turbine (ST) power plant is electrically isolated from the outside grid to which the plant normally supplies electric power (hence the name islanding). Among other reasons, the plant might be placed into islanding mode because the electric power transmission system that it normally supplies has gone down and is cold. Or the plant might be placed into a standby state while the power transmission system is operational and powered from other sources, e.g., for plant maintenance. In such scenarios, the plant might be in islanding mode because of a planned occurrence or due to unplanned events. The length of the plant downtime might be known or not, and might be longer or shorter. It is advantageous to have an ability to maintain the operational status of elements of the plant, in a standby mode poised to return full load, efficiently and without risking undue stress or damage to the plant equipment.

In island mode while not connected to the grid, a power plant can be run at a very low output power level, for example producing only enough electric power to satisfy the "house load." The plant is self-sufficient but not generating electric power to the grid. In addition to keeping essential plant functions operative, an advantage of running in island mode instead of shutting the plant down, is faster return to regular operation after unplanned events necessitating shutdown from full power operation, for example after a disruptive event that can be diagnosed and corrected in a reasonably short time but causes the breakers coupling the plant to the power grid to open.

The event might relate to conditions on the power grid or conditions in the plant. As a result, it may be advantageous to enter island mode when the power grid is down, in which case electric power for the house load is generated by the plant. In some scenarios, the plant may be shifted into a low power, idling or partially disabled mode while the power grid is functioning and electric power is available from the grid. In that case, electric power for the house load might be taken out of the power grid.

The house load refers to the electric power requisite to operate all plant auxiliary equipment (e.g., boiler feed pumps, circulating water pumps, building HVAC, lighting, etc.). In a nuclear power plant, the house load also includes the reactor coolant pumps and all other equipment requisite for the safe operation of the nuclear reactor, including for protection of the reactor when not operating normally. The actual level of the house load is dependent upon the specific plant design and, for example, might be between 5% and 15% of the rated ST load. Running a plant at such a low level, perhaps one twentieth of its rated capacity, can stress the operating equipment because elements are operated outside of their optimized ranges of temperature, pressure, flow rate, etc. Equipment issues can also result from other low load operational effects, such as erosion of last stage turbine blades due to spray cooling required at the turbine exhaust when operating at very low loads.

The island mode concept may be reserved for a "survival" mode typically entered in response to an unplanned "event." A steam turbine power plant is not designed with the intention of running in island mode as a nominal mode of operation. Assuming that the event in question is the unexpected opening of the breaker that connects the power plant to the grid, within seconds the generator load drops from its present level (such as 100%, 80% or 90% of rated load) to about 10%. Feedback controls reduce the flow through steam turbine admission valves. Bypass valves may be opened to vent excess steam no longer being admitted to the ST (at a rate that can approach the full rated steam flow rate). Condenser pressure may increase substantially due to additional steam coming in, which requires design attention to the process of assuming island mode operation and the nature and duration of possible island mode operation. (Typically, above 5-6 inches of mercury, the condenser pressure is reaching alarm levels and may be approaching protective trip settings.)

For a plant equipped with islanding capability, an important goal is to enable smooth entry into islanding mode, resolving issues within the plant so operation resumes at the lower islanding rate, without damaging equipment or causing protective trips. Another goal is to operate at the low islanding rate safely and without undue stress on the equipment for a period of time. The need to enable transition into islanding operation may have been foreseen, and embodied in a plant design, but perhaps not to last for more than a few hours due to risks associated with low steam flow operation at low load, e.g., 10% of rated load or less. After that, the plant design might contemplate an orderly shutdown.

A primary risk associated with remaining in island mode for an extended time after the initial transient period is the risk of accelerated last stage bucket erosion due to the effects of hood sprays. One remedy is to reduce the condenser pressure by reducing the amount of steam generated in the boiler. In a nuclear power plant, this will be limited by the need to maintain at least the reactor's minimum stable load. Typically, reduced steam generation goes together with a reduction in main and reheat steam temperatures. This leads to "forced cooling" of the steam turbine high and medium/intermediate pressure (HP and IP) shell and rotor. Operation at lower than nominal design temperature leads to loss of radial clearance control and potential radial rub induced vibration. The severity of this effect is dependent on the magnitude of the forced cooling (the temperature difference below nominal), and the rate at which the cooling occurs (rate of temperature change per unit time).

Typically, grid events leading to islanding operation are expected to be resolved in less than two hours. After the initial stress of shifting into islanding mode, a short time in islanding mode does not present a undue risk of damage, for example to the steam turbine. However if the possibility of an extended grid event is high (such as several days) and it is desired to configure the plant to remain operational in islanding mode for an extended time, poised to shift back to regular operation without a costly shutdown, then methods and apparatus are needed for enabling the plant to operate in island mode with less risk, particularly without risk of damage to the main steam turbine. Advantageously, this need is met according to the invention, while likewise serving additional objects as will become apparent in this description.

SUMMARY DESCRIPTION OF INVENTION

It is an object of the invention to configure a steam turbine plant for islanding, including to operate at very low loading limited to supplying house load while decoupled from the power grid, and also to enable additional advantageous operational states while coupled to the grid. According to one aspect, a low load condensing steam turbine is introduced and enabled to operate a mechanical drive train that is decoupleable from the main steam turbine and includes one or more rotating synchronous electric machines, i.e., an electric machine functioning as a motor or generator depending on torque and electromagnetic field excitation conditions.

The low load condensing steam turbine can be of a type similar to steam turbines used to drive boiler feed pumps in large fossil fired steam turbine power plants (commonly known as a boiler feed pump turbine or BFPT). That turbine, herein referred to as the Low-Load Turbine or LLT, is rated at a fraction of the main ST rated output, e.g., about 10 to 15%, sufficient to carry the house electrical load when the electric generator is disconnected from the grid. During normal plant operation, the LLT runs in a warm-up or stand-by mode, drawing enough steam (from the lowest possible main ST extraction point) to run the LLT at a lowest possible stable load, keeping the LLT warm and ready to jump into action when required. During islanding mode plant operation (which is the normal mode for the LLT), the LLT draws its rated steam flow (from the designated main ST extraction point) and generates its rated power to rotate the electric generator, then coupled to maintain the house load. In this mode, the main ST is brought back to its stand-by mode, rotating at the turning gear speed and separated from the electric generator via a self-synchronizing slip clutch (SSS).

As a beneficial additional aspect enabled according to the inventive configuration, the LLT, alone or with the aid of a Load Commutated Inverter (LCI), is arranged to bring the generator (the synchronous electric machine) up to speed for operation as a synchronous condenser for supplying reactive power (VAR) to the electric grid when the grid is operational but the plant is effectively islanding. In this operational mode, the main ST is on turning gear and mechanically disconnected from the electric generator drive train via the SSS clutch. The synchronous electric machine is brought up to the speed necessary to synchronize it with the local electricity grid by the LLT (and the LCI if necessary). The LCI, also known as a Static Starter, drives the synchronous machine as a motor to provide starting torque and power until the LLT draws enough steam to become self-sustaining. Once synchronized to the grid, the generator can be disconnected from the LLT (and the LCI). Thereafter, the generator acts as a synchronous motor, driven by the electrical grid, with excitation of the field windings phased for supplying reactive power (VAR) to the grid. The synchronous machine draws leading current from the grid when the synchronous motor fields are overexcited and draws lagging current from the grid when underexcited.

Accordingly, the foregoing and other objects and aspects are provided in a steam turbine driven electric power plant that has a main steam turbine coupleable to at least one source of pressurized steam during nominal operation to apply torque to an alternating current (AC) synchronous rotating electrical machine operating as an electric generator supplying power to a power grid. The main steam turbine can be shifted into a substantially inoperative state when assuming an islanding mode of the plant, especially when the power grid is disabled or when the plant needs to be decoupled electrically from the grid. In the islanding mode, a relatively small industrial steam turbine is provided to operate instead of the main steam turbine, applying torque to the alternating current (AC) synchronous rotating electrical machine so as to operate as a generator. The industrial steam turbine is powered from a lower energy and/or lower flow steam supply for which the industrial steam turbine is rated. In the islanding mode electric power is generated at a fraction of the normal level, preferably for use to supply house power only, maintaining the plant in a state ready for prompt shift back to nominal operation. Advantageously, this technique avoids operating the main steam turbine and its source of steam at operating parameters for which they are not rated and optimized, e.g., at a highly throttled condition.

A controllable clutch couples a shaft of the main steam turbine and a shaft of the rotating electrical machine during nominal operation of the power plant to generate alternating current to a power grid from torque applied by the main steam turbine to the rotating electrical machine. The industrial steam turbine, coupleable to the synchronous electrical machine at least during islanding mode, has a much smaller rating than the main steam turbine, for example 10% to 15% of a rating of the main steam turbine. Associated valves and controls are configured and controlled by the distributed control system of the plant to decouple the main steam turbine substantially from the source of pressurized steam during the islanding mode and to operate the industrial steam turbine for applying torque to the rotating electrical machine for supplying power equal to a house load of the plant.

At its small rating, the industrial steam turbine keeps the plant in a poised state ready for restarting. An auxiliary boiler can be provided to supply pressurized steam at a likewise small rating apt for operating the industrial steam turbine at a capacity for the which the auxiliary boiler and industrial steam turbine are optimized to operate together. In other respects, the nominal elements of the plant can be used at low ratings during islanding. The industrial steam turbine is coupleable to the main drive shaft to run the rotating electrical machine used as the electric generator for regular operation, but at lower power during the islanding mode. The industrial steam turbine exhausts to the plant main steam condenser to which the main steam turbine exhausts in the regular mode.

In some embodiments, the industrial steam turbine can be operated from other steam sources. For example, a steam exhaust path from the main steam turbine can be coupled to the industrial steam turbine. Alternatively, the industrial steam turbine can be powered from a steam bypass around the main steam turbine from the plant's primary steam generator if operated at a low level, for example in the case of a nuclear power plant where waste heat remains to be used or shed in the islanding mode.

Shifting between modes of operation is accomplished under control of a distributed control system coupled to associated valves and switches configured to operate the power plant in a power generation mode wherein torque from the main steam turbine is coupled through the clutch to turn the rotating electrical machine while operating as an electric generator for supplying electric power to the power grid. The distributed control system switches the power plant into an islanding mode wherein the main steam turbine is disengaged by the clutch and torque from the industrial steam turbine is coupled to turn the rotating electrical machine while operating as an electric generator for supplying electric power to operate the plant independently of power grid. The industrial steam turbine can be coupleable to and decoupleable from the rotating electrical machine by either a SSS clutch and gearbox or at least one of a torque converter and a gear transmission controllable by the distributed control system. The distributed control system is configured selectively to switch the power plant into a reactive power mode wherein the main steam turbine and the industrial steam turbine are decoupled from the rotating electrical machine while operating the rotating electrical machine as a synchronous condenser coupled to the power grid and excited by the distributed control system for adjusting a phase relationship of current and voltage on the power grid.

This disclosure concerns apparatus as described, and also concerns method aspects for operating a power plant having a main steam turbine coupleable by a conduit to a source of steam and coupleable mechanically by a drive shaft to a rotating electrical machine operable as an electric generator electrically coupleable to a power grid. The method includes coupling the main steam turbine to the source of steam and via the drive shaft to the electric generator, operating the electric generator synchronously on the power grid while applying torque to the electric generator from the main steam turbine, thereby generating and transmitting electrical power to the power grid at a nominal rating during a nominal operating mode of the plant. By also providing an industrial steam turbine operable at a rating that is less than the nominal rating, the plant is switchable into at least an islanding mode wherein the industrial steam turbine is coupleable on the drive shaft to operate the electric generator, rather than the main steam turbine.

The plant selectively switches from the nominal operating mode into an islanding mode, including mechanically decoupling the main steam turbine from the electric generator and coupling the industrial steam turbine to the electric generator, and in the islanding mode, decoupling the electric generator from the power grid and operating the electric generator at the rating less than the nominal rating to satisfy house power requirements for maintaining operation of the plant. The islanding mode can be assumed when the power grid is taken down, triggering breakers. The islanding mode can also be assumed deliberately, e.g., for purposes of plant maintenance. In another mode, the plant can be arranged to operate the electric generator, which is a synchronous rotating machine, as a mechanically unloaded motor coupled to the power grid while the power grid is operating as powered for other plants, namely by switching from the nominal operating mode into a reactive power mode. Switching into the reactive power mode includes mechanically decoupling the main steam turbine and the industrial steam turbine from the electric generator, coupling the electric generator electrically to the power grid with the power grid operating and the electric generator being unloaded. The field windings of the electric generator are excited at a phase relationship to the power grid such that the electric generator functions as a synchronous condenser supplying reactive power to the grid. The phase varied excitement (leading or lagging to over-excite or under-excite the synchronous machine) extracts and/or supplies leading or lagging current, usefully adjusting the power factor of the power grid.

BRIEF DESCRIPTION OF THE DRAWINGS

This disclosure presents certain exemplary embodiment, one being shown in the drawing. It should be appreciated that the invention is not limited to this exemplary embodiment and is capable of variations within the scope defined in the claims. In the drawing, FIG. 1 is a schematic diagram illustrating an exemplary steam turbine powered electric power generation plant according to an embodiment of the invention.

DETAILED DESCRIPTION OF EXEMPLARY EMBODIMENTS

An inventive steam turbine powered electric power generation plant is shown schematically in FIG. 1. The FIGURE shows a large utility steam turbine 1 (herein the main ST or MST). The ST 1 can be of a type known for large fossil fuel fired boiler plants or nuclear power plants. As depicted in FIG. 1, the MST 1 can be considered, for example, a nuclear ST with separate HP (high pressure) and multi-flow low pressure (LP, LP1) sections separated by a combined moisture separator and reheater 10 (MS/RHTR). The MST 1 is connected to an electric generator 3 via a self synchronizing clutch, SSS 2.

Also connected to the electric generator 3 is a small steam turbine (herein the low load turbine or LLT 4). This turbine 4 can be similar in design to a boiler feed pump turbine (BFPT) of the kind sometimes deployed in large boiler plants. The LLT 4 is mechanically coupled to the electric generator 3 (rotating at 3,000 or 3,600 rpm). The term "coupled" as used herein defines an operational relationship. A coupling need not be a direct connection but may instead concern an operational connection made through one or more intervening elements. This is characterized by FIG. 1 in that the LLT 4 is coupled to the electric generator 3 through a gearbox 5 and torque converter (or SSS) 11.

It is an aspect of the invention that the plant is configured so as to be capable of assuming an islanding mode and also has the ability to provide certain supplementary functions when in islanding mode and when the power grid may or may not be otherwise powered. When the power plant goes into extended island mode requiring decoupling from the electric power grid (which can be anything longer than a momentary interruption), breakers coupling the generator 3 to the electric power grid are opened. The power plant in that case is separated from the grid and from the electric load to which the grid is coupled.

The MST 1 is shut down, preferably in a controlled manner, and is placed into a stand-by mode (rotating at a very low speed on turning gear). A plant Distributed Control System (DCS), not shown, is programmed or configured to operate controls including the depicted valves to cause the MST 1 to be brought down in power. Preferably the MST is shut down in a manner preventing shaft rotation overspeed that might otherwise ensue due to loss of mechanical resistance when the electric generator 3 becomes electrically unloaded.

The DCS rapidly closes steam admission valves and opens the steam bypass valves associated with the MST steam feed line 6. During this sequence, the DCS preferably controls to ensure that the MST does not overspeed and that steam safety valves do not lift due to overpressure.

In a typical steam power plant, the DCS brings the MST 1 to a load level sufficient to supply the requisite house load (i.e., about 10% of the rated power) and keeps the load level there for a limited amount of time (e.g., a few hours). During that time, the grid connection may be restored. For longer events, the ST 1 and the power plant is completely shut down because extended operation at this low power level can result in damage to the equipment.

It is an aspect of the present invention that, the MST 1 is kept at a low load level (e.g., the house load) long enough to allow the LLT 4 to start and engage to take over house load electric power generation duty. The MST 1 is rolled down to the turning gear speed, and the SSS clutch 2 disengages. The LLT 4 is configured, for example, to generate up to 15% of the MST rated power output using (i) HP steam extracted upstream of the HP section of the MST along steam line 6, or (ii) LP steam along steam line 7, or (iii) a combination of the HP and LP streams depending on house load requirements. The remainder of HP steam is bypassed to the main condenser 9 and the MST 1 is kept on turning gear, while ready to restart when the grid is restored and rated electrical power is to be generated.

During normal operation of the power plant, the LLT is decoupled from the steam turbine generator drive train via the torque converter (or SSS) 11. In this stand-by mode, the LLT 4 is (i) either kept on turning gear or (ii) rolled using LP steam extracted from the crossover coupled to steam line 7. If the latter option is selected, the LLT can be arranged to generate its lowest possible stable power output, as dictated by its design and per OEM recommendations. In either operational mode, LLT exhaust 8 is sent to the plant's main condenser 9.

The arrangement of LLT 4 as shown enables the operation of the synchronous machine 3 (otherwise functioning as an electrical generator) as a synchronous condenser while the MST 1 is off-line and the plant is shut down. One scenario for this condition might be a long term outage, whether planned or unplanned, for maintenance and repairs.

As a synchronous condenser, the generator 3 (i.e., the synchronous machine) supplies reactive power VAR to the grid. Based on the phase at which excitation is applied to the windings of the generator/machine 3, leading or lagging the voltage and current on the grid, the generator/machine draws leading current from the grid when overexcited and lagging current from the grid when underexcited. This is a valuable service, for which the plant owner typically can derive income from the Regional transmission organizations (RTO) such as PJM, who continuously monitors and seek to manage reactive power using condensers and the like. This service can be rendered to the RTO even though the plant is not running the in the normal sense to generate real power (i.e., regular resistive power).

In the operational mode wherein the synchronous machine 3 functions as a synchronous condenser, the MST 1 is on turning gear and mechanically disconnected from the machine/generator 3 via the SSS clutch 2. The synchronous machine/generator can be brought up to rotational speed as necessary to synchronize machine 3 with the local grid by torque from the LLT 4. It is likely in this mode that the fossil fuel fired boiler or the nuclear reactor is also shut down. If so, the requisite steam can be supplied using an auxiliary boiler 13, which also supplies the steam needed for maintaining the vacuum for steam condenser 9.

Depending on design considerations including the size and inertia of the generator/machine 3, the size of the auxiliary boiler size (i.e., the steam generation capacity), the size (i.e., rating) of LLT 4 and the specifications of the gearbox 5 and torque converter (or SSS) 11, as well as economic trade-offs, the system may include a Load Commutating Inverter (LCI) 12. The LCI, also known as a Static Starter, drives the generator/machine as a motor to provide starting torque and power until the LLT 4 draws enough steam to become self-sustaining. Once synchronized to the grid, the generator/machine 3 is disconnected from the LLT 4 via the torque converter (or SSS) 11 (basically, shutting down the steam flow to the LLT 4) and from the LCI 12 by opening its breaker. Thereafter, the generator/machine 3 acts as a synchronous condenser, namely and unloaded synchronous rotating machine wherein phase controlled field excitation current supplied by a controller such as the plant DCS, serves to cause the machine 3 (acting as a synchronous condenser) to adjust the reactive power on the grid.

An additional use for the LLT 4 is to start the system from cold iron to synchronization and full-speed, full-load (FSFL) operation. When a start command is given by the DCS, LCI 12 starts to crank the generator. At this time, the MST 1 is still on turning gear with steam generated by the boiler being bypassed to the condenser 9. The LLT 4 is started by admitting HP steam or LP steam (or a combination of both) or steam from the auxiliary boiler 13. Once the LLT 4 reaches the output requisite for self-sustaining speed, the LCI 12 is turned off. The LLT 4 brings the generator 3 to synchronization and thereafter keeps the generator 3 running at a low load while waiting for the MST 1 to warm up through the temperature matching controlled by the plant DCS.

In an alternatively method, the startup can be handled by the LLT 4 substantially alone without reliance on an LCI 12. The small (relatively speaking) thermal inertia of the LLT 4 ensures that the plant can be synchronized to the grid as fast as possible without imposing excessive thermal stress on the much larger MST 1 and/or the boiler as well as the steam pipes and valves interconnecting the two. The LLT 4 in that event also facilitates a smooth return to full power nominal operation of the plant.

The invention has been disclosed in connection with certain embodiments disclosed as examples, but it should be understood that the invention is not limited to the exemplary embodiments. Reference should be made to the appended claims to assess the scope of the invention in which exclusive rights are claimed.

What is claimed is:

1. A steam turbine driven electric power plant comprising:
    a main steam turbine coupleable to at least one source of pressurized steam;
    an alternating current (AC) synchronous rotating electrical machine;
    a clutch controllably coupling a shaft of the main steam turbine and a shaft of the rotating electrical machine at least during nominal operation of the power plant to generate alternating current to a power grid from torque applied by the main steam turbine to the rotating electrical machine;
    an industrial steam turbine, coupleable to the synchronous electrical machine, the industrial steam turbine having a smaller rating than the main steam turbine; and,
    associated valves and controls configured during an islanding mode of the plant to decouple the main steam turbine substantially from the source of pressurized steam and to operate the industrial steam turbine for applying torque to the rotating electrical machine.

2. The power plant of claim 1, wherein the smaller rating of the industrial steam turbine is 10% to 15% of a rating of the main steam turbine.

3. The power plant of claim 1, wherein the smaller rating of the industrial steam turbine as applied to the synchronous electrical machine provides electric power substantially equal to a house load of the plant, and further comprising a distributed controller operable to power the plant from the synchronous electrical machine during an islanding mode in which the plant is at least substantially decoupled from the power grid.

4. The power plant of claim 1, wherein the smaller rating of the industrial steam turbine as applied to the synchronous electrical machine provides electric power sufficient to maintain a poised state of the plant for fast restarting.

5. The power plant of claim 1, further comprising an auxiliary boiler operable to produce pressurized steam for operating the industrial steam turbine.

6. The power plant of claim 5, wherein the industrial steam turbine exhausts to a plant main condenser to which the main steam turbine exhausts.

7. The power plant of claim 5, wherein the industrial steam turbine is coupled to a steam exhaust from the mains steam turbine.

8. The power plant of claim 5, wherein the industrial steam turbine is coupled to a steam bypass around the main steam turbine.

9. The power plant of claim 1, further comprising a distributed control system coupled to associated valves and switches configured to operate the power plant in a power generation mode wherein torque from the main steam turbine is coupled through the clutch to turn the rotating electrical machine while operating as an electric generator for supplying electric power to the power grid.

10. The power plant of claim 9, wherein the distributed control system is configured selectively to switch the power plant into an islanding mode wherein the main steam turbine is disengaged by the clutch, and torque from the industrial steam turbine is coupled to turn the rotating electrical machine while operating as an electric generator for supplying electric power to operate the plant independently of power grid.

11. The power plant of claim 10, wherein the industrial steam turbine is coupleable to and decoupleable from the rotating electrical machine by a gearbox and the clutch comprises an SSS clutch controllable by the distributed control system.

12. The power plant of claim 10, wherein the industrial steam turbine is coupleable to and decoupleable from the rotating electrical machine by a torque converter and a gear transmission.

13. The power plant of claim 10, wherein the distributed control system is configured selectively to switch the power plant into a reactive power mode wherein the main steam turbine and the industrial steam turbine are decoupled from the rotating electrical machine and the rotating electrical machine while operating the rotating electrical machine as a synchronous condenser coupled to the power grid and excited by the distributed control system for adjusting a phase relationship of current and voltage on the power grid.

14. The power plant of claim 13, further comprising a load commutating inverter coupled to the rotating electrical machine and operable under control of the distributed control system to bring the rotating electrical machine up to speed for selectively starting one of the main steam turbine and the industrial steam turbine and synchronizing said one of the main steam turbine and the industrial steam turbine to maintain a synchronized rotational speed of the rotating electrical machine.

15. A method of operating a power plant having a main steam turbine coupleable by a conduit to a source of steam and coupleable mechanically by a drive shaft to a rotating electrical machine operable as an electric generator electrically coupleable to a power grid, the method comprising:
 coupling the main steam turbine to the source of steam and via the drive shaft to the electric generator, to operate the electric generator synchronously on the power grid while applying torque to the electric generator from the main steam turbine, thereby generating and transmitting electrical power to the power grid at a nominal rating during a nominal operating mode of the plant;
 providing an industrial steam turbine operable at a rating that is less than the nominal rating, wherein the industrial steam turbine is coupleable on the drive shaft to operate the electric generator;
 selectively switching from the nominal operating mode into an islanding mode, including mechanically decoupling the main steam turbine from the electric generator and coupling the industrial steam turbine to the electric generator, and in the islanding mode, decoupling the electric generator from the power grid and operating the electric generator at the rating less than the nominal rating to satisfy house power requirements for maintaining operation of the plant.

16. The method of claim 15, further comprising switching from the nominal operating mode into a reactive power mode, including mechanically decoupling the main steam turbine and the industrial steam turbine from the electric generator, coupling the electric generator electrically to the power grid with the power grid operating and the electric generator being unloaded, and exciting windings of the electric generator at a phase relationship to the power grid such that the electric generator functions as a synchronous condenser supplying reactive power to the grid.

* * * * *